United States Patent [19]
Ohtsuka et al.

[11] 3,750,783
[45] Aug. 7, 1973

[54] OVERRUNNING CLUTCH FOR USE IN AN AUTOMOTIVE POWER TRANSMISSION

[75] Inventors: Kunio Ohtsuka Naka-ku, Yokohama; Wataru Ishimaru, Asahi-ku, Yokohama, both of Japan

[73] Assignee: Nissan Motor Company, Limited, Yokohama, Japan

[22] Filed: Apr. 12, 1972

[21] Appl. No.: 243,381

[30] Foreign Application Priority Data
Aug. 20, 1971  Japan.............................. 46/74290
Aug. 23, 1971  Japan.............................. 46/74892

[52] U.S. Cl............ 192/45, 192/48.92, 192/85 AA, 192/109 R, 188/71.5, 188/82.84
[51] Int. Cl........................................... F16d 41/06
[58] Field of Search................ 192/45, 48.3, 48.92, 192/85 AA, 109 R; 188/82.84, 71.5

[56] References Cited
UNITED STATES PATENTS

| 3,054,489 | 9/1962 | Fahlberg............... 192/45 |
| 545,017 | 8/1895 | Hargraves.............. 192/45 X |
| 847,784 | 3/1907 | King..................... 192/45 X |
| 1,942,909 | 1/1934 | Von Thungen........... 192/45 |
| 1,775,832 | 9/1930 | Schenck................. 192/45 X |
| 1,864,142 | 6/1932 | Mayer................... 188/82.84 X |
| 3,053,361 | 9/1962 | Hause.................... 192/45 X |

*Primary Examiner*—Allan D. Herrmann
*Attorney*—John Lezdey

[57] ABSTRACT

An overrunning clutch adapted to permit free rotation of the inner and outer wheels with respect to each other when one of the inner and outer wheels rotates in one direction. Either one of the inner and outer wheels is formed with at least three radially extending projecting portions at circumferentially equally spaced positions, which projecting portions engage with the opposing peripheral wall of another one of the inner and outer wheels to prevent deflection of the inner and outer wheels with respect to each other, and at least two cam surfaces at circumferentially equally divided positions between the adjacent projecting portions. At least two rollers are disposed about the cam surfaces between the inner and outer wheels so that the smooth operation is obtained.

5 Claims, 4 Drawing Figures

OVERRUNNING CLUTCH FOR USE IN AN AUTOMOTIVE POWER TRANSMISSION

This invention relates in general to overrunning clutches and, more particularly, to an overrunning clutch for use in an automotive automatic power transmission including a hydrodynamic torque converter and a planetary gear set.

An overrunning clutch employed in an automotive automatic power transmission commonly includes a cylindrical inner wheel and a cylindrical outer wheel which is formed at its inner wall a plurality of cam surfaces. A plurality of rollers are disposed about these cam surfaces between the inner wall of the outer wheel and an outer surface of the inner wheel. With this construction, the overrunning clutch functions to permit free rotation of the inner and outer wheels with respect to each other when one of the inner and outer wheels rotate in one direction. When, however, the one of the inner and outer wheels rotate in another or reverse direction, the rollers functions to wedge between the outer surface of the inner wheel and the cam surfaces on the outer wheel thereby to inhibit free rotation of the inner and outer wheels with respect to each other. A difficulty is encountered in this prior overrunning clutch in that the center of the inner wheel is deviated from that of the outer wheel during rotation. To eliminate this difficulty, it has heretofore been proposed to provide a plurality of projection portions on the inner wall of the outer wheel which projecting portions extend radially inwardly from the inner wall of the outer wheel and which engage the outer surface of the inner wheel. The provision of these projecting portions is, however, refelcted by decrease in the number of rollers so that it is quite difficult to obtain smooth rotation of the movable members.

In the automotive automatic power transmission, the overrunning clutch is sized to be mounted in a limited space to reduce the size of the automaitc power transmission. This overrunning clutch is mounted in the automatic power transmission in such a manner that the cylindrical outer wheel is press fitted into a bore formed in a casing body of the power transmission whereas the cylindrical inner wheel is rotatably connected to a rotatable member such as driving shaft. With this construction, when thrust is exerted on the driving shaft, the inner wheel connected therewith tends to move in axial direction thereby causing the rollers to move in the same direction. At the same time, the outer wheel is caused to axially move out of the associated bore in the casing body of the power transmision due to the thrust applied to the driving shaft. To eliminate this drawback, it is requisite that the overrunning clutch be provided with additional component parts which leads to increase in its mounting space.

It is, therefore, an object of the present invention to provide an improved overrunning clutch which is adapted not only to smoothly operate but to prevent deflection of the movable part relative to the stationary part.

It is another object of the present invention to provide an improved overrunning clutch which is specifically suited for use in an automotive automatic power transmission.

It is a further object of the present invention to provide an improved overrunning clutch for use in an automotive automatic power transmission, which clutch is adapted to prevent axial movement or deflection of the rollers and movable part with respect to the stationary part of the automotive automatic power transmission.

In general, these objects of the present invention is achieved by an overrunning clutch which includes a cylindrical inner wheel and a cylindrical outer wheel. In one preferred embodiment, cylindrical outer wheel has a cylindrical inner wall on which at least three projecting portions are formed at circumferentially equally spaced positions. The projecting portions extend axially inwardly from the cylindrical inner wall of the outer wheel and engage the cylindrical outer wall of the inner wheel. The cylindrical inner wall of the outer wheel is further formed with at least two cam surfaces at circumferentially equally divided positions between the adjacent projecting portions extending inwardly from the cylindrical inner wall of the outer wall. Rollers are disposed between the cylindrical outer wall of the inner wheel and the cam surfaces on the outer wheel. The overruning clutch also includes a flange portion which extends radially outwardly from the outer wall of the outer wheel and which abuts against a side wall of a casing body of an automotive automatic power transmission. The outer wheel has an annular shoulder portion formed in the cylindrical inner wall thereof into which an annular thrust plate is fixedly disposed which prevents axial movement of the rollers with respect to the outer wheel. A plurality of thrust bearing rollers are disposed between the annular thrust plate and a drum member fixed to the inner wheel so that the thrust exerted on the drum member and the inner wheel is transmitted through the thrust bearing rollers to the anular plate from which the thrust is delivered through the flange portion formed on the outer wheel to the casing body of the automatic power transmission.

These and other objects and advantages of the present invention will become more apparent from the following description when taken in conjunction with the accompanying drawings in which same reference numeral are used to designate like or corresponding component parts and in which.

Figure 1:
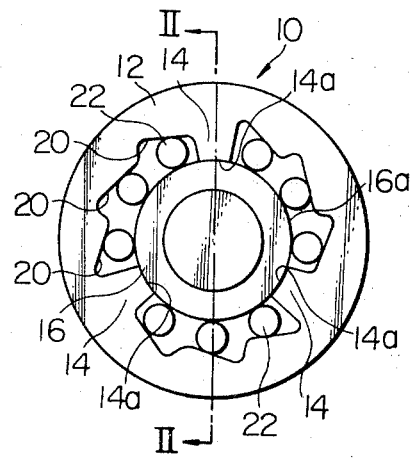
FIG. 1 is a side view of a preferred embodiment of an overrunning clutch according to the present invention.
Figure 2:
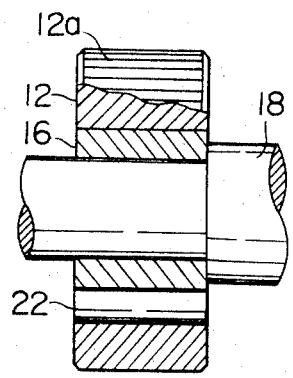
FIG. 2 is a sectional view of the overrunning clutch taken on line II—II of FIG. 1.

Referring now to the drawings and more particularly to FIGS. 1 and 2, there is shown a preferred embodiment of the overrunning clutch implementing the present invention. The overrunning clutch proposed by the present invention is specifically suited for use in an automotive automatic power transmission as will be described hereinafter in detail. The overrunning clutch, which is generally designated by reference numeral 10, includes a cylindrical outer wheel 12 which has a knurled surface 12a formed at its outer peripheral wall. This outer wheel 12 may be fixedly mounted within a casing body (not shown) of an automotive automatic power transmission as will be discussed hereinafter.

According to an important feature of the present invention, the cylindrical outer wheel 12 is formed at its cylindrical inner wall (not identified) at circumferentially equally spaced poistions with at least three projecting portions 14 which extend radially inwardly from the cylindrical inner wall of the outer wheel 12. Each of these projecting portions 14 has an inner peripheral wall 14a which engages an outer periphral wall 16a of a cylindrical inner wheel 16, which is drivably connected to and rotatable with a driving shaft 18 of the automotive automatic power transmission (not shown). As seen in FIG. 1, the outer wheel 12 is further formed at its cylindrical inner peripheral wall with cam surfaces or inclined surfaces 20 each inclined at the same angle with respect to the center of the overrunning clutch 10. These cam surfaces 20 are formed at circumferentially equally divided positions. Similar rollers 22 corresponding in number to the cam surfaces 20 are disposed between the cam surfaces 20 on the outer wheel 12 and the cylindrical outer peripheral wall 16a of the inner wheel 16.

It should be noted that although the projecting portions 14 and the cam surfaces 20 are shown as formed on the inner peripheral wall of the outer wheel 12 in FIG. 1, these may be formed on the outer periphral wall of the inner wheel in a manner as will be described in detail.

When, in operation, the driving shaft 18 rotates counterclockwise as viewed in FIG. 1, the rollers 22 are moved in the same direction due to the frictional force. Consequently, the rollers 22 are released from wedged condition between the outer peripheral wall 16a of the inner wheel 16 and the cam surfaces 20 formed on the outer wheel so that the inner wheel 16 and accordingly the driving shaft 18 are freely rotatable with respect to the outer wheel 12. Since, in this condition, the projecting portions 14 on the outer wheel 12 engage at its peripheral wall 14a the outer peripheral wall 16a of the inner wheel 16, the inner wheel 16 is prevented from being deflected from the center of the outer wheel 12.

When, in contrast, the driving shaft 18 tends to rotate in clockwise direction as viewed in FIG. 1, the rollers 22 are caused to wedge between the outer peripheral wall 16a of the inner wheel 16 and the cam surfaces 20 formed in the inner peripheral wall of the outer wheel 12. Accordingly, the driving shaft 18 and accordingly the inner wheel 16 are prevented from being rotated in the clockwise direction because the outer wheel 12 is fixed to the stationary part or casing body of the automaitc power transmission or previously described.

It should be born in mind that, in the illustrated embodiment, the overrunning clutch of the present invention is shown and described as having the inner wheel being rotatable in one direction with respect to the outer wheel but the inner wheel may be held stationary while the outer wheel is made rotatable in one direction.

Figure 3:
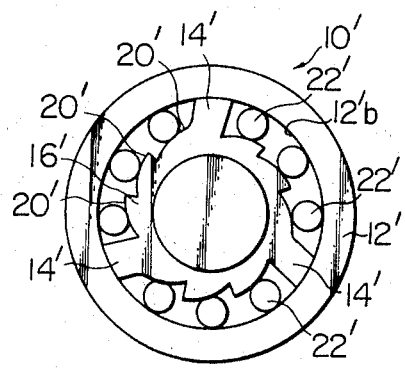
FIG. 3 is a side view of a modified form of the overrunning clutch according to the present invention.

FIG. 3 illustrates a modified form of the overrunning clutch according to the present invention. In this modification, the projecting portion indicated at 14' are formed on the inner wheel 16' at circumferentially equally spaced positions and engage the inner peripheral wall 12'b of the outer wheel 12. Moreover, the cam surfaces 20' are formed on the inner wheel at circumferentially equally divided positions between the adjacent projection portions 14' and the rollers 22' are disposed between these cam surfaces 20' and the inner peripheral wall 12'b of the outer wheel. The operation of the overrunning clutch 10' is similar to that of the overrunning clutch shown in FIGS. 1 and 2, and, therefore, the detail discussion of the same is herein omitted for the sake of simplicity of illustration.

Figure 4:
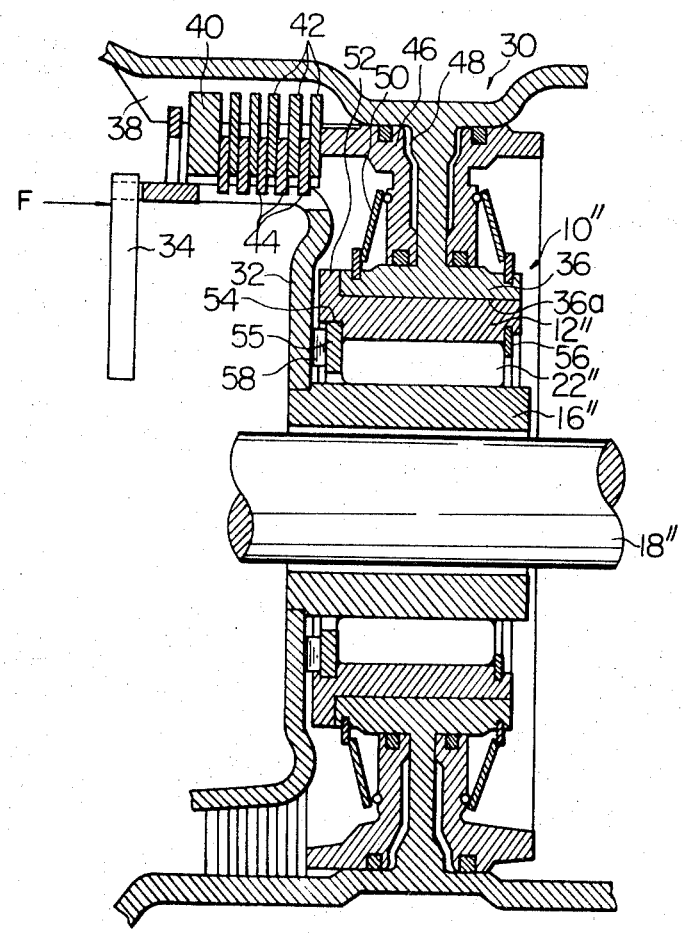
FIG. 4 is a sectional view of another preferred embodiment of the overrunning clutch according to the present invention, the overrunning clutch being shown as incorporated in an automotive automatic power transmission.

Another preferred embodiment of the overrunning clutch according to the presnet invention is illustrated in FIG. 4, wherein like component parts are designated by the same reference numerals as those used in FIGS. 1 and 2 with the exception that a double prime ('') has been added to those. In this illustrated embodiment, the overrunning clutch 10'' is shown as incorporated in a usual automotive automatic power transmission, a part of which is shown in FIG. 4. In FIG. 4, the automatic power transmission indicated at 30 is shown to have a drum member 32 which is fixedly connected to the inner wheel 16'' of the overrunning clutch 10'' and which is connected to a part 34. As shown, the overrunning clutch 10'' is fixedly mounted within a bore 36a formed in a casing body 36. The casing body 36 is formed with a spline 38 to which a retainer plate 40 is secured. A plurality of driving disc plates 42 are splined to the spline 38 on the casing body 36 and are axially slidable. A plurality of driven disc plates 44 are interleaved between the plurality of driving disc plates 42 and splined to a spline (not identified) formed on the drum member 32 to be axially movable. To actuate these disc plates 42 and 44, a fluid pressure operated servo piston 46 is provided which are axially slidable disposed in a fluid chamber 48 formed in the casing body 36 and which is movable in a position to cause the disc plates 42 and 44 to engage with each other when the fluid pressure is supplied to the fluid chamber 48. A return spring 50 which is in the form of an annular Belleville washer is associated with the fluid pressure operated servo piston 46 to bias the same in the disengagement position.

According to another important feature of the present invention, the overrunning clutch 10'' also includes a flange portion 52 which extends radially outwardly of the peripheral wall of the outer wheel 12'' and which abuts against the side wall (not identified) of the casing body 36. The outer wheel 12'' has an annular shoulder portion 54 into which an annular thrust plate 55 is fixedly disposed which prevents axial displacement of the rollers 22'' in association with a snap ring 56 which is fixed to the outer wheel 12''. A plurality of thrust beariing rollers 58 are disposed between the annular thrust plate 55 andthe drum member 32 so that the force F applied to the part 34 is transmitted to the thrust plate 55. When assembling, the outer wheel 12'' is press fitted into the bore 36a of the casing body 36 until the flange portion 52 on the outer wheel 12'' abuts against the side wall of the casing body 36.

When, in operation, the fluid pressure is not supplied to the fluid chamber 48, the fluid pressure operated servo piston 46 is moved rightwardly of the drawing by the action of the return spring 50. Consequently, the disc plates 42 and 44 are maintained in their disengagement position and, thus, the drum member 32 and the inner wheel 16'' are rotatable in a direction as permitted by the overrunning clutch 10''.

When, however, the fluid pressure is supplied to th fluid chamber 48, the fluid pressure operated servo piston 46 is moved leftwardy of the drawing against the force of the return spring 50. In this instance, the disc plates 42 and 44 are pressed against the retainer plate 40 and engage with each other so that the drum member 32 and the inner wheel 16'' are held stationary with respect to the casing body 36. When this takes place, the inner wheel 16'' is prevented from being rotatated in either direction.

It will be appreciated that, during these operations, if the force F is applied to the drum member 32 this force F is transmitted to the casing body 36 through the thrust bearing rollers 58 and the annular thrust plate 55 thereby to prevent transmission of the thrust to the inner wheel 16'' for inhibitting axial displacement of the inner wheel 16'' with respect to the casing body 36. Since, in this condition, the rollers 22'' are disposed between the thrust plate 55 and the snap ring 56 with a certain clearance so that no thrust is exerted on the rollers 22''.

It will now be understood that the overrunning clutch embodying the present invention smoothly operates without causing deflection of the movable part with respect to the stationary part.

It will also be noted that the overrunning clutch according to the present invention effectively prevents axial deflection of the rollers and movable part with respect to the stationary parts even when the thrust is exerted thereon.

What is claimed is:

1. An overrunning clutch comprising an inner wheel having an outer periphral wall, an outer wheel facing said outer peripheral wall of said inner wheel having an inner peripheral wall, at least three radially extending projecting portions provided on either one of said outer peripheral wall of said inner wheel and said inner peripheral wall of said outer wheel at circumferentially equally spaced positions, said projecting portions engaging another one of said outer peripheral wall of said inner wheel and said inner peripheral wall of said outer wheel, a plurality of cam surfaces provided on said either one of said outer peripheral wall of said inner wheel and said inner peripheral wall of said outer wheel at circumferentially equally divided positions between adjacent said projecting portions, each of said cam surfaces being inclined at the same angle with respect to the center of said overrunning clutch, and a plurality of rollers disposed between said cam surfaces and said another one of said outer peripheral wall of said inner wheel and said inner peripheral wall of said outer wheel.

2. An overrunning clutch comprising an inner wheel having an outer peripheral wall, an outer wheel having an inner peripheral wall facing said outer peripheral wall of said inner wheel, at least three projection portions radially inwardly extending from said inner peripheral wall of said outer wheel at circumferentially equally spaced positions, said projecting portions each having a peripheral wall engaging said outer peripheral wall of said inner wheel to prevent eccentricity of said inner wheel with respect to said outer wheel, a plurality of cam surfaces formed on said inner peripheral wall of said outer wheel at circumferentially equally divided positions between adjacent said projecting portions, each of said cam surfaces being inclined at the same angle with respect to the center of said overrunning clutch, and a plurality of rollers disposed in between said outer peripheral wall of said inner wheel and said cam surfaces formed on said inner peripheral wall of said outer wheel, said rollers being capable of contacting said outer peripheral wall of said inner wheel and said cam surfaces on said outer wheel, whereby said inner wheel is prevented from rotation in one direction with respect to said outer wheel.

3. An overrunning clutch comprising an inner wheel having an outer peripheral wall, an outer wheel having an inner peripheral wall facing said outer peripheral wall of said inner wheel, at least three projecting portions radially outwardly extending from said outer peripheral wall of said inner wheel at circumferentially equally spaced positions, said projecting portions each having a peripheral wall engaging said inner peripheral wall of said outer wheel to prevent eccentricity of said outer wheel with respect to said inner wheel, a plurality of cam surfaces formed on said outer peripheral wall of said inner wheel at circumferentially equally divided positions between said adjacent projecting portions, each of said cam surfaces being inclined at the same angle with respect to the center of said overrunning clutch, and a plurality of rollers disposed in between said cam surfaces on said inner wheel and said inner peripheral wall of said outer wheel, said rollers being capable of contacting said inner peripheral wall of said outer wheel and said cam surfaces on said inner wheel, whereby said outer wheel is prevented from rotation in one direction with respect to said inner wheel.

4. An overrunning clutch for an automotive automatic power transmission having a casing body and a drum member, said overrunning clutch comprising an inner wheel connected to said drum member and having an outer peripheral wall, an outer wheel press fitted into a bore of said casing body a flange portion extending radially outwardly from the outer peripheral wall of said outer wheel and abutting against said casing body, an annular shoulder portion formed in said peripheral wall of said outer wheel, an annular thrust plate fixedly disposed in said annular shoulder portion on said outer wheel, and a plurality of thrust bearing rollers disposed between said drum member and said thrust plate to transmit the thrust exerted on said drum member to said casing body through said thrust plate on said annular shoulder portion of said outer wheel.

5. An overrunning clutch for an automotive automatic power transmission having a casing body and a drum member, said overrunning clutch comprising an inner wheel connected to said drum member and having an outer peripheral wall, an outer wheel press fitted to a bore of said casing body and having an inner peripheral wall, at least three radially extending projecting portions provided on either one of said outer peripheral wall of said inner wheel and said inner peripheral wall of said outer wheel at circumferentially equally spaced positions, said projecting portions engaging another one of said outer peripheral wall of said inner wheel and said inner peripheral wall of said outer wheel, at least two cam surfaces provided on said either one of said outer peripheral wall of said inner wheel and said inner periphral wall of said outer wheel at circumferentially equally divided positions between adjacent said projecting portions, at least two rollers disposed about said cam surfaces between said outer peripheral wall of said inner wheel and said inner periphral wall of said outer wheel, a flange portion extending radially outwardly from the outer peripheral wall of said outer wheel and abutting against said casing body, an annular shoulder portion formed in said inner peripheral wall of said outer wheel, an annular thrust plate fixedly disposed in said annular shoulder portion on said outer wheel, and a plurality of thrust bearing rollers disposed between said drum member and said thrust plate to transmit the thrust exerted on said drum member to aid casing body through said thrust plate on said annular shoulder portion of said outer wheel.

* * * * *